United States Patent
Yu et al.

(10) Patent No.: US 10,869,063 B2
(45) Date of Patent: *Dec. 15, 2020

(54) DEBLOCKING FILTERING CONTROL

(71) Applicant: Telefonaktiebolaget LM Ericsson (publ), Stockholm (SE)

(72) Inventors: Ruoyang Yu, Solna (SE); Kenneth Andersson, Gävle (SE); Jonatan Samuelsson, Enskede (SE); Per Wennersten, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/471,765

(22) PCT Filed: Jan. 10, 2017

(86) PCT No.: PCT/SE2017/050015
§ 371 (c)(1),
(2) Date: Jun. 20, 2019

(87) PCT Pub. No.: WO2018/132043
PCT Pub. Date: Jul. 19, 2018

(65) Prior Publication Data
US 2019/0349606 A1 Nov. 14, 2019

(51) Int. Cl.
*H04N 19/86* (2014.01)
*H04N 19/117* (2014.01)
(Continued)

(52) U.S. Cl.
CPC ............ *H04N 19/86* (2014.11); *H04N 19/117* (2014.11); *H04N 19/137* (2014.11); *H04N 19/176* (2014.11); *H04N 19/82* (2014.11)

(58) Field of Classification Search
CPC .... H04N 19/86; H04N 19/117; H04N 19/137; H04N 19/176; H04N 19/82; H04N 19/14
See application file for complete search history.

(56) References Cited

U.S. PATENT DOCUMENTS 8,576,906 B2 * 11/2013 Andersson ............. H04N 19/70
375/240.03
8,787,443 B2 * 7/2014 Sun ........................ H04N 19/51
375/240

(Continued)

FOREIGN PATENT DOCUMENTS

WO   WO 2013/162441 A1   10/2013
WO   WO-2013162441 A1 * 10/2013 ........... H04N 19/117

OTHER PUBLICATIONS

International Search Report and Written Opinion of the International Searching Authority for International Application No. PCT/SE2017/050015 dated Sep. 27, 2017.

(Continued)

*Primary Examiner* — Richard A Hansell, Jr.
(74) *Attorney, Agent, or Firm* — Sage Patent Group

(57) ABSTRACT

A deblocking filtering control involves deciding whether to apply deblocking filtering to sample values in a sample block in a picture and in a neighboring sample block in the picture based on i) a first magnitude modification of sample prediction values in a first prediction block in a reference picture for the sample block and ii) a second magnitude modification of sample prediction values in a second prediction block in the reference picture for the neighboring sample block. The sample block and the neighboring sample block are separated in the picture by a block boundary. This decision to apply deblocking filtering based on magnitude modifications reduce blocking artefacts that may otherwise arise in certain pictures of a video sequence.

21 Claims, 9 Drawing Sheets

(51) Int. Cl.
*H04N 19/137* (2014.01)
*H04N 19/176* (2014.01)
*H04N 19/82* (2014.01)

(56) References Cited

U.S. PATENT DOCUMENTS

| | | | |
|---|---|---|---|
| 2008/0117981 A1 | 5/2008 | Lee et al. | |
| 2008/0144722 A1 | 6/2008 | Park et al. | |
| 2010/0183068 A1 | 7/2010 | Pandit et al. | |
| 2013/0113884 A1* | 5/2013 | Leontaris | H04N 19/186 348/43 |
| 2013/0163666 A1* | 6/2013 | Leontaris | H04N 19/186 375/240.12 |
| 2014/0072043 A1* | 3/2014 | Tourapis | H04N 19/136 375/240.15 |
| 2014/0133551 A1* | 5/2014 | Alshina | G06T 3/4007 375/240.03 |
| 2014/0369428 A1* | 12/2014 | Park | H04N 19/117 375/240.29 |
| 2018/0027255 A1* | 1/2018 | Alshina | H04N 19/503 375/240.16 |
| 2019/0281294 A1* | 9/2019 | Kim | H04N 19/182 |

OTHER PUBLICATIONS

Munteanu et al., "Performing Deblocking in Video Coding Based on Spatial-Domain Motion-Compensated Temporal Filtering," Advanced Concepts for Intelligent Vision Systems (ACIVS 2006), Lecture Notes in Computer Science (LNCS vol. 4179), Jan. 1, 2006, pp. 364-374.

Liu et al., "Unified Loop Filter for High-Performance Video Coding," 2010 IEEE International Conference on Multimedia and Expo (ICME), Jul. 19, 2010, pp. 1271-1276.

International Telecommunication Union, "Series H: Audiovisual and Multimedia Systems, Infrastructure of audiovisual services—Coding of moving video, High Efficiency Video Coding," ITU-T, H. 265, Apr. 2013, 317 pages.

European Search Report for European Application No. 17890938.8 dated Dec. 10, 2019.

Park et al., "MVC Deblocking for Illumination Compensation," Joint Video Team (JVT) of ISO/IEC MPEG & ITU-T VCEG, 22nd Meeting: Marrakech, Morocco, Jan. 13-19, 2007, Document JVT-V033, 22 pages.

Norkin et al., "HEVC Deblocking Filter," IEEE Transactions on Circuits and Systems for Video Technology, vol. 22, No. 12, Dec. 2012, pp. 1746-1754.

\* cited by examiner

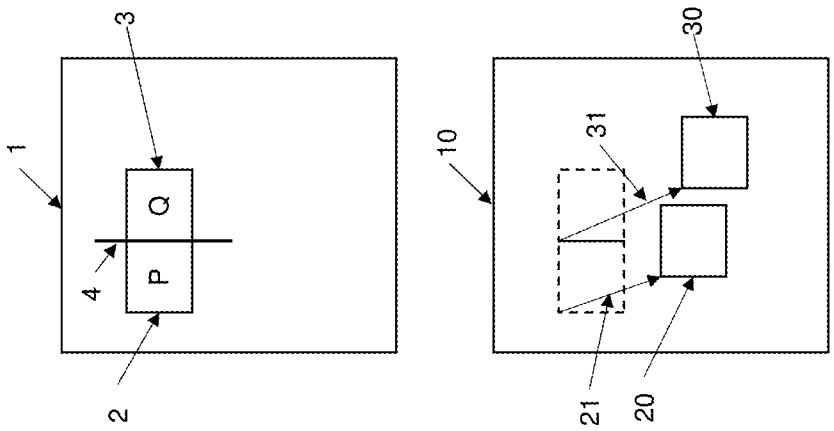
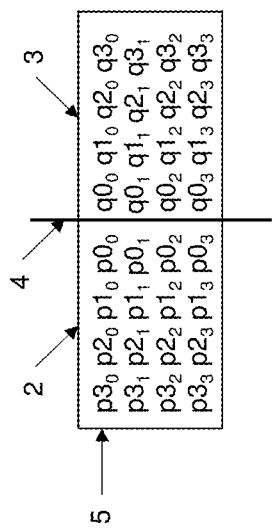
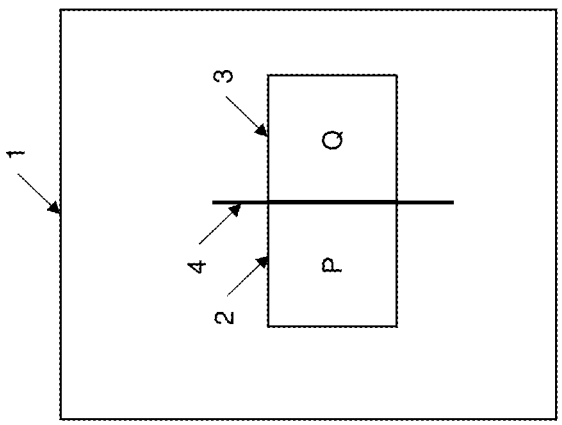

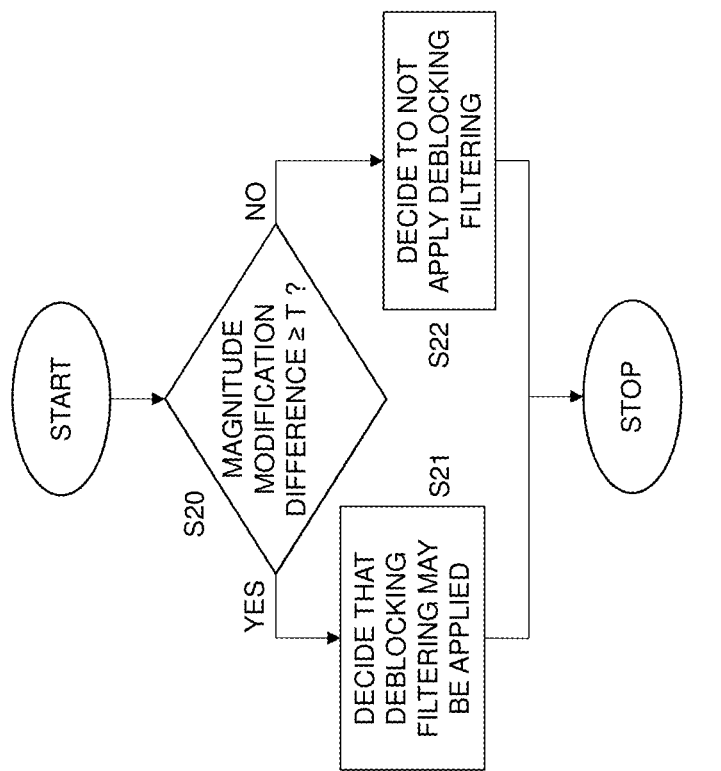
Fig. 6
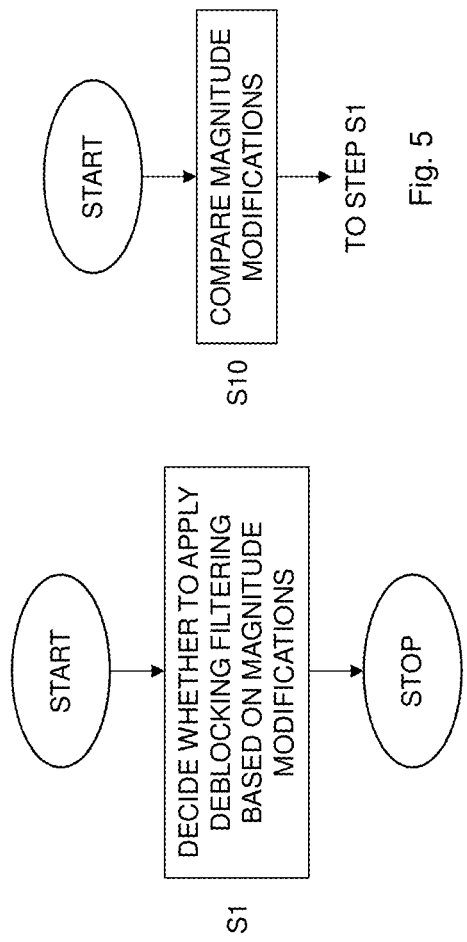
Fig. 5
Fig. 4

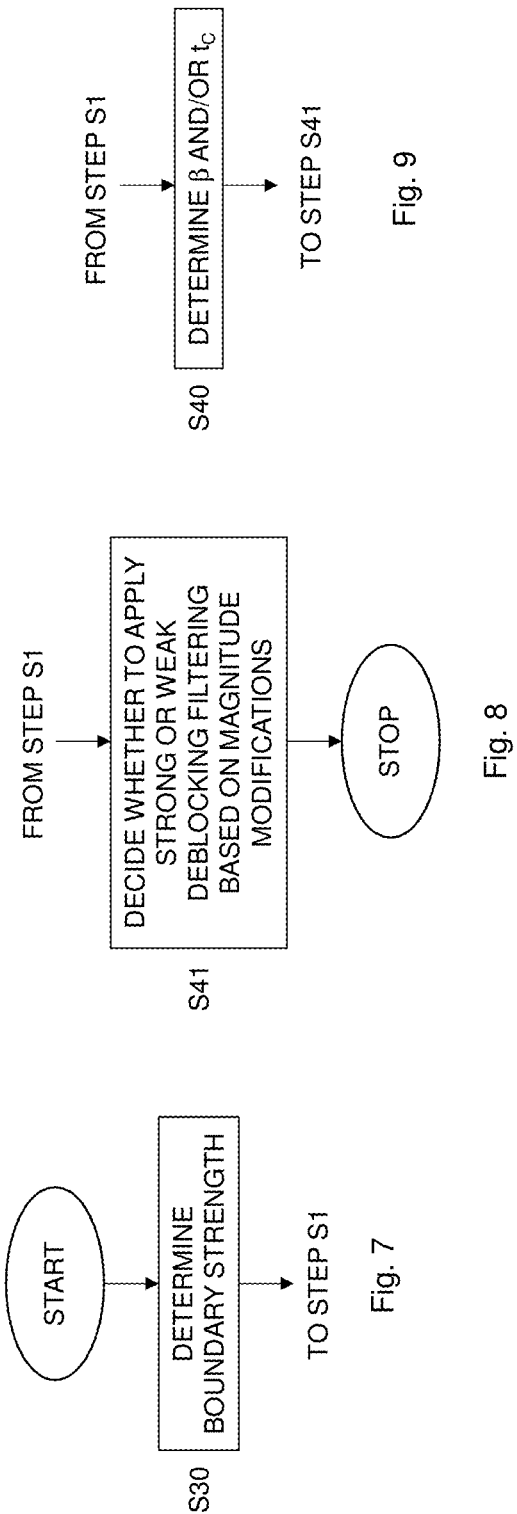

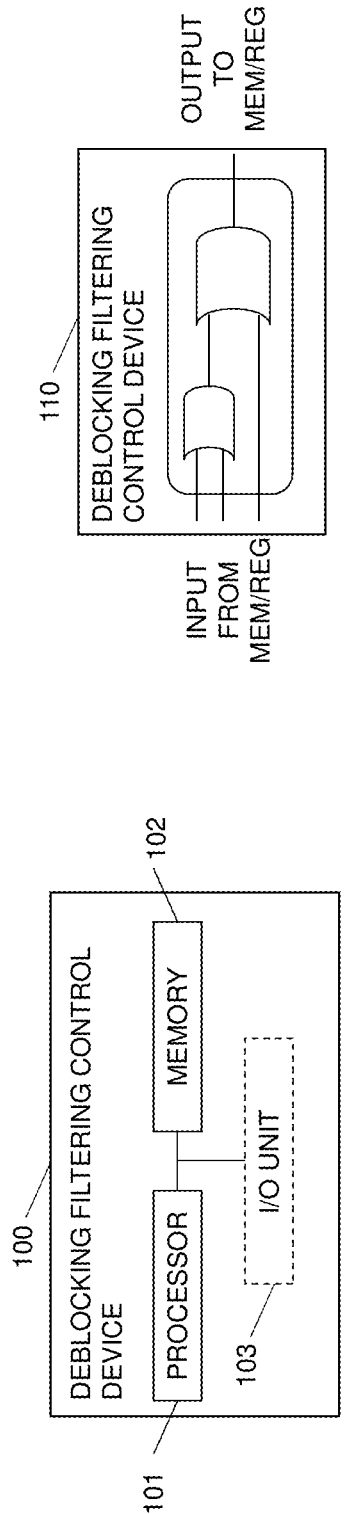

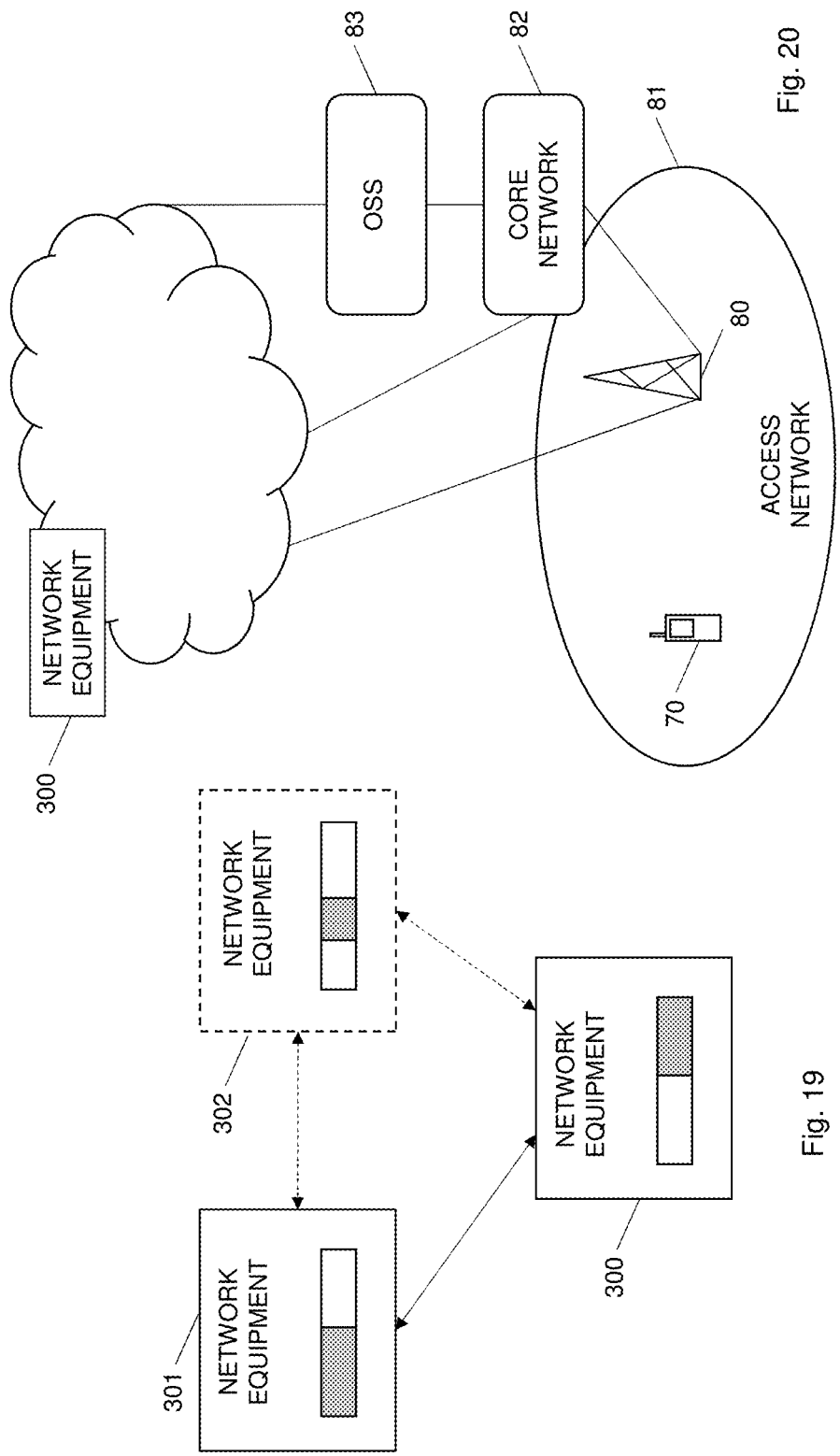

DEBLOCKING FILTERING CONTROL

CROSS REFERENCE TO RELATED APPLICATION

This application is a 35 U.S.C. § 371 national stage application of PCT International Application No. PCT/SE2017/050015, filed on Jan. 10, 2017, the disclosure of which is hereby incorporated herein by reference in its entirety.

TECHNICAL FIELD

The present embodiments generally relate to deblocking filtering, and in particular to control of deblocking filtering of sample values of a sample block in a picture.

BACKGROUND

Most video coding standards are built based on block-based prediction and transform coding. Pictures in a video sequence to be encoded are divided into sample blocks as base units for prediction. There are mainly two prediction methods: spatial prediction, also referred to as intra prediction, and temporal prediction, also referred to as inter prediction. For video sequences that are captured by camera in real-life, it is highly likely that much redundant information exists either within a picture or across several pictures. The motivation of the two prediction methods is to exploit these redundancies in different dimensions to reduce the size of the video following encoding.

Intra prediction removes spatial redundancy. It predicts a sample block using previously decoded sample blocks within the current picture. A picture consisting of only intra-predicted sample blocks is referred as an intra picture.

Inter prediction removes temporal redundancy. It predicts sample blocks in a current picture using one or two prediction blocks that belong to one or two previously decoded pictures. The previously decoded pictures that are used for prediction are referred to as reference pictures. The location of a referenced prediction block inside a reference picture is indicated using a motion vector. Each motion vector consists of x and y components, which correspond to the displacement between current sample block and the referenced prediction block. In order to capture the displacement more accurately, the motion vectors could point to fractional sample positions in the reference picture. Those fractional samples are generated from the nearby integer samples using interpolation.

When encoding a non-intra picture, i.e., an inter picture, it is possible to have several reference pictures. These reference pictures are usually grouped into two reference picture lists. The reference pictures that are output for display before the current picture are grouped into list 0. The reference pictures that are output for display after the current picture are grouped into list 1. Inter-predicted sample blocks have two inter prediction types, uni- and bi-prediction. Uni-prediction is achieved by predicting from one prediction block in one reference picture. Bi-prediction is achieved by predicting from a blending of two prediction blocks in one or two reference pictures. The default blending method in most video coding standards is the average of the two prediction blocks.

Deblocking is a filtering process that aims at eliminating block artefacts. As the sample blocks are encoded relative independently, there is a predisposition towards discontinuities on the block boundaries between neighboring sample blocks. The deblocking filtering is designed to tackle such discontinuities. The decision whether to apply deblocking filtering lies on the hypothesis that a block boundary tends to be visible when there is a large discrepancy between the two neighboring sample blocks.

The video coding standard High Efficiency Video Coding (HEVC), also referred to as as H.265 and MPEG-H Part 2, uses a parameter called boundary strength $B_S$ as an indication of the discrepancy level over block boundaries. The $B_S$ parameter is estimated by comparing prediction information, such as prediction mode, motion vectors and reference pictures, for the current sample block 2 and its neighboring sample block 3 in a picture 1, see FIG. 1.

Considering the two sample blocks P and Q 2, 3, the boundary strength $B_S$ is decided, in HEVC, to be larger than 0 when any of the following criteria is met:
- At least one of the two sample blocks 2, 3 uses intra prediction as prediction mode.
- The two sample blocks 2, 3 use different number of motion vectors and/or different number of reference pictures. For instance, the sample block P 2 uses uni-direction inter prediction, whereas the sample block Q 3 uses bi-direction inter prediction.
- The two sample blocks 2, 3 use different reference pictures. For instance, the sample block P 2 uses a reference picture with Picture Order Count (POC) value 0, whereas the sample block Q 3 uses a reference picture with POC value 4.
- The two sample blocks 2, 3 use the same reference picture but the difference between the motion vectors is equal to or larger than a threshold value of 4 either in the horizontal or vertical direction. For instance, the sample block P 2 uses a motion vector $MV_P=(6, 5)$, whereas the sample block Q 3 uses a motion vector $MV_Q=(-2, 0)$.

More information of derivation of the $B_S$ parameter in HEVC can be found in section 8.7.2.4 Derivation process of boundary filtering strength in [1].

More advanced deblocking filtering performs some additional analyses on the reconstructed or decoded sample values inside the sample blocks 2, 3. These additional analyses try to identify whether the sample blocks 2, 3 are smooth or not. As for sample blocks that are not smooth but with details, deblocking filtering should be avoided as it can induce unwanted blurring. In HEVC, these checks are performed on sample values on either side of the block boundary 4 separating the two sample blocks 2, 3 as is described in sections 8.7.2.5.3 Decision process for luma block edges and 8.7.2.5.6 Decision process for a luma sample in [1].

The deblocking filtering in current video coding standards, such as HEVC, has shortcomings and may produce visually unpleasant blocking artefacts in some situations, such as in video sequences with fading effects. Thus, there is a need for improvement in the deblocking filtering control, and in particular such improvements that may reduce blocking artefacts in pictures of a video sequence.

SUMMARY

It is a general objective to provide a deblocking filtering control that may reduce the risk of block artefacts in pictures of a video sequence.

This and other objectives of the embodiments are met by embodiments as disclosed herein.

An aspect of the embodiments relates to a deblocking filtering control method. The deblocking filtering control method comprises deciding whether to apply deblocking filtering to sample values in a sample block in a picture and in a neighboring sample block in the picture based on i) a first magnitude modification of sample prediction values in a first prediction block in a reference picture for the sample block and ii) a second magnitude modification of sample prediction values in a second prediction block in the reference picture for the neighboring sample block. The sample block and the neighboring sample block are separated in the picture by a block boundary.

Another aspect of the embodiments relates to a deblocking filtering control device. The deblocking filtering control device is configured to decide whether to apply deblocking filtering to sample values in a sample block in a picture and in a neighboring sample block in the picture based on i) a first magnitude modification of sample prediction values in a first prediction block in a reference picture for the sample block and ii) a second magnitude modification of sample prediction values in a second prediction block in the reference picture for the neighboring sample block. The sample block and the neighboring sample block are separated in the picture by a block boundary.

A further aspect of the embodiments relates to a deblocking filtering control device. The deblocking filtering control device comprises a decision module for deciding whether to apply deblocking filtering to sample values in a sample block in a picture and in a neighboring sample block in the picture based on i) a first magnitude modification of sample prediction values in a first prediction block in a reference picture for the sample block and ii) a second magnitude modification of sample prediction values in a second prediction block in the reference picture for the neighboring sample block. The sample block and the neighboring sample block are separated in the picture by a block boundary.

Yet another aspect of the embodiments relates to a computer program comprising instructions, which when executed by at least one processor, cause the at least one processor to decide whether to apply deblocking filtering to sample values in a sample block in a picture and in a neighboring sample block in the picture based on i) a first magnitude modification of sample prediction values in a first prediction block in a reference picture for the sample block and ii) a second magnitude modification of sample prediction values in a second prediction block in the reference picture for the neighboring sample block. The sample block and the neighboring sample block are separated in the picture by a block boundary.

A further aspect of the embodiments relates to a carrier comprising a computer program as defined above. The carrier is one of an electronic signal, an optical signal, an electromagnetic signal, a magnetic signal, an electric signal, a radio signal, a microwave signal, or a computer-readable storage medium.

The embodiments reduce the risk of visually annoying blocking artefacts in pictures of a video sequence, and in particular in video sequences with fades. Accordingly, the subjective quality may be improved by eliminating or at least reducing such block artefacts.

BRIEF DESCRIPTION OF THE DRAWINGS

The embodiments, together with further objects and advantages thereof, may best be understood by making reference to the following description taken together with the accompanying drawings, in which:

FIG. 1 schematically illustrates adjacent sample blocks separated by a block boundary in a picture;

FIG. 2 schematically illustrates a sample block and a neighboring sample block;

FIG. 3 schematically illustrates inter prediction for a sample block and a neighboring sample block;

FIG. 4 is a flow chart illustrating a deblocking filtering control method according to an embodiment;

FIG. 5 is a flow chart illustrating an additional, optional step of the deblocking filtering control method shown in FIG. 4 according to an embodiment;

FIG. 6 is a flow chart illustrating a deblocking filtering control method according to another embodiment;

FIG. 7 is a flow chart illustrating an additional, optional step of the deblocking filtering control method shown in FIG. 4 according to another embodiment;

FIG. 8 is a flow chart illustrating an additional, optional step of the deblocking filtering control method shown in FIG. 4 according to a further embodiment;

FIG. 9 is a flow chart illustrating an additional, optional step of the deblocking filtering control method shown in FIG. 8 according to an embodiment;

FIG. 13 is a schematic block diagram of a deblocking filtering control device according to an embodiment;

FIG. 14 is a schematic block diagram of a deblocking filtering control device according to another embodiment;

FIG. 19 schematically illustrates a distributed implementation among network equipment; and FIG. 20 is a schematic illustration of an example of a wireless communication system with one or more cloud-based network equipment according to an embodiment.

DETAILED DESCRIPTION

Figure 11:
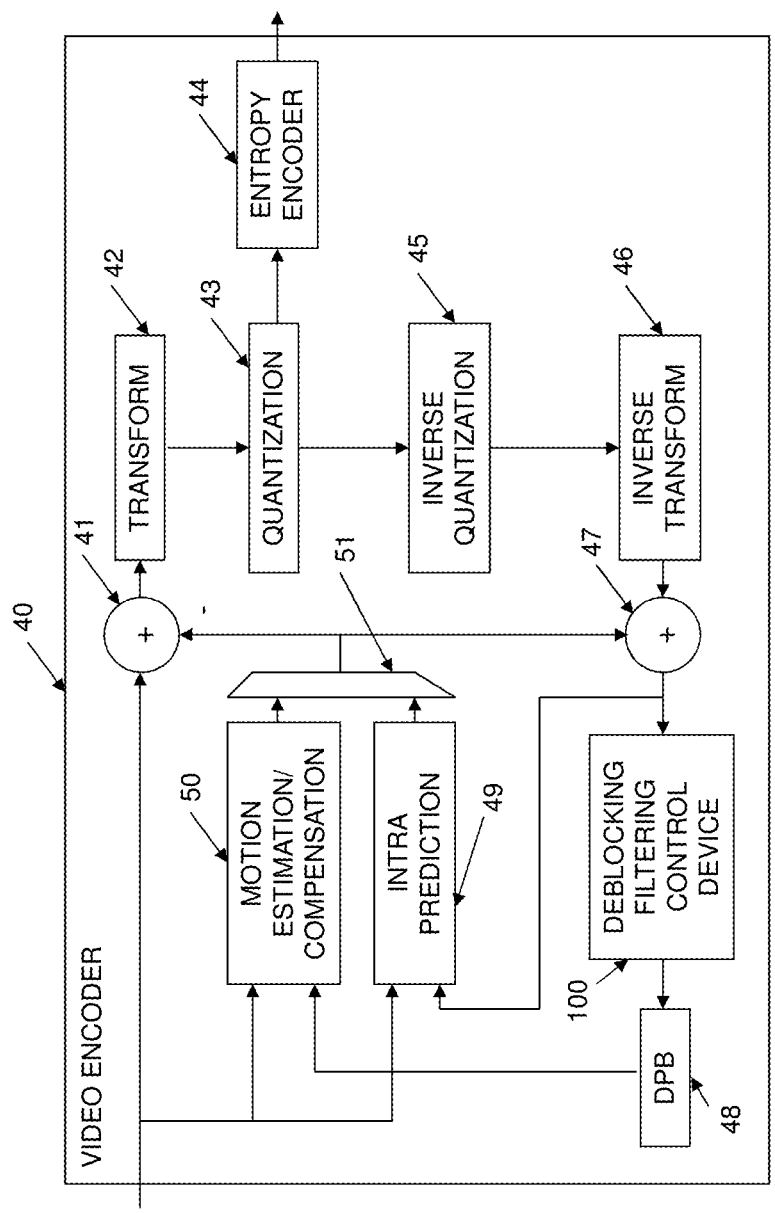
FIG. 11 is a schematic block diagram of a video encoder according to an embodiment.

Throughout the drawings, the same reference numbers are used for similar or corresponding elements.

The present embodiments generally relate to deblocking filtering, and in particular to control of deblocking filtering of sample values of a sample block in a picture.

The prior art deblocking filtering is applied to block boundaries based on the prediction information of the two neighboring sample blocks separated, either in the vertical or horizontal direction, by the block boundary. Generally, and with regard to inter predicted sample blocks, deblocking filtering is applied if there is a difference in the prediction information, such as using different numbers of motion vectors and/or reference pictures, using different reference pictures and/or using significantly different motion vectors.

However, there might be situations in which blocking artefacts are visually present even if the prior art deblocking filtering control decides not to apply any deblocking filtering to a block boundary between neighboring sample blocks. In particular, pictures with fading effects have a tendency to have visually annoying blocking artefacts since the prior art deblocking filtering control fails to select block boundaries in such pictures for application of deblocking filtering.

In the following, the present embodiments are described further with reference to FIGS. 1-3 illustrating a sample block P 2 in a picture and a neighboring sample block Q 3 in the picture, and where the two sample blocks 2, 3 are separated by a block boundary 4. In these figures, the block boundary 4 is a vertical block boundary 4 and the two sample blocks 2, 3 are positioned side-by-side in the picture 1. However, the embodiments also apply to a horizontal block boundary separating two sample blocks positioned with one sample block above the other sample block in the picture.

Thus, deblocking filtering control according to the embodiments is preferably applied to vertical block boundaries, horizontal block boundaries or both vertical and horizontal block boundaries in a picture of a video sequence.

FIG. 3 not only illustrates the current picture 1 of the video sequence but also a reference picture 10 of the video sequence. Thus, a first prediction block 20 in the reference picture 10 is used for prediction of the sample values of the sample block 2 in the current picture 1. This first prediction block 20 is identified by a motion vector 21 determined for the sample block 2. Correspondingly, a second prediction block 30 in the reference picture 10 is used for prediction of the sample values of the neighboring sample block 3 in the current picture 1. The second prediction block 30 is identified by a motion vector 31 determined for the neighboring sample block 3.

A sample value, also denoted pixel value in the art, of a sample, also denoted pixel in the art, in the sample block 2 or in the neighboring sample block 3 could be any sample value assigned to samples in sample blocks 2, 3 to be encoded and decoded. In a typical embodiment, the sample value is a color component value.

FIG. 2 schematically indicates sample values in a sample block 2 and its neighboring sample block 3. In FIG. 2 with a vertical block boundary 4, $pj_i$ denotes a sample value of a sample in row i and column j in the sample block 2 and $qj_i$ correspondingly denotes a sample value of a sample in row i and column j in the neighboring sample block 3. In this example, row numbering goes from up to down as shown in FIG. 2, whereas column numbering goes from the block boundary 4 and to the left in FIG. 2 for the sample block 2 and to the right in FIG. 2 for the neighboring sample block 3.

Video coding uses various color spaces and formats to represent the colors of the sample values in the pictures 1, 10 of the video sequence. Non-limiting, but illustrative, examples of such color spaces or formats include red (R), green (G), blue (B) color, i.e., RGB color; luma (Y') and chroma (Cb, Cr) color, i.e., Y'CbCr color; luminance (Y) and chrominance (X, Z) color, i.e., XYZ color; luma (I) and chroma (Ct, Cp) color, i.e., ICtCp color. In such a case, a sample value as used herein could be any color component value, such as a R, G, B, Y', Cb, Cr, X, Y, Z, I, Ct or Cp value. In a particular embodiment, a sample value is a luma value Y' or a chroma value Cb or Cr, more preferably a luma value Y'.

FIG. 4 is a flow chart of a deblocking filtering control method according to an embodiment. The deblocking filtering control method comprises deciding, in step S1, whether to apply deblocking filtering to sample values in a sample block 2 in a picture 1 and a neighboring sample block 3 in the picture 1 based on i) a first magnitude modification of sample prediction values in a first prediction block 20 in a reference picture 10 for the sample block 2 and ii) a second magnitude modification of sample prediction values in a second prediction block 30 in the reference picture 10 for the neighboring sample block 3. The sample block 2 and the neighboring sample block 3 are separated in the picture 1 by a block boundary 4.

In an embodiment, the first prediction block 20 is identified in the reference picture 10 based on a motion vector 21 associated with or determined for the sample block 2. Correspondingly, the second prediction 30 is identified in the reference picture 20 based on a motion vector 31 associated with or determined for the neighboring sample block 3.

The first prediction block 20 and the second prediction block 30 could be a same prediction block in the reference picture 10. Thus, in such a case the respective motion vectors 21, 31 identifies a same prediction block in the reference picture 10. Alternatively, the first prediction block 20 and the second prediction block 30 are different prediction blocks 20, 30 in the reference picture 10.

The motion vector 21 associated with the sample block 2 and identifying the first prediction block 20 could have the same vector coordinates as the motion vector 31 associated with the neighboring sample block 3 and identifying the second prediction block 30, i.e., $MV_P = MV_Q = (x, y)$. Alternatively, at least one of the x coordinate and the y coordinate differs between the motion vectors 21, 31. In a particular embodiment, any difference between the motion vector 21 associated with the sample block 2 and the motion vector 31 associated with the neighboring sample block 3 is smaller than the previously mentioned threshold value, preferably 4, both in the horizontal direction (x coordinate) and the vertical direction (y coordinate), i.e., $|x_P - x_Q| < T$ and $|y_P - y_Q| < T$, wherein $MV_P = (x_P, y_P)$, $MV_Q = (x_Q, y_Q)$ and T denotes the threshold value.

If the difference between the motion vectors 21, 31 is equal to or larger than the threshold value then deblocking filtering is preferably applied to the block boundary 4 according to the prior art techniques by setting the boundary strength $B_S$ to a value larger than 0 as mentioned in the foregoing.

The deblocking filtering control of the embodiments performs the decision whether to apply deblocking filtering or not at least partly based on respective magnitude modification of sample prediction values in the first and second prediction block 20, 30 in the reference picture 10. This means that even if the first and second prediction blocks 20, 30 are the same or the motion vectors 21, 31 do not differ more than the threshold value it could be beneficial to apply deblocking filtering to the block boundary 4 if different magnitude modifications have been applied to the sample prediction values in the first prediction block 20 as compared to the sample prediction values in the second prediction block 30.

Thus, the embodiments provide a new criterion with regard to deblocking filtering control. This criterion involves magnitude modifications of sample prediction values in the prediction blocks 20, 30. This new criterion could be used alone in the deblocking filtering control. In an alternative embodiment, the criterion is used together with other criteria in deciding whether to apply deblocking filtering. This means that the decision in step S1 could be based solely on the magnitude modifications or be based at least partly on the magnitude modifications, which are further described here below.

Magnitude modification as used herein indicates a modification that changes the magnitude of the sample prediction values in the prediction blocks 20, 30. Non-limiting, but illustrative, examples of such magnitude modifications include weights and offsets. For instance, weights applied to the prediction blocks 20, 30 will scale the sample prediction values, i.e., change a sample prediction value $v_{ij}$ into weight×$v_{ij}$. Correspondingly, offsets applied to prediction blocks 20, 30 will modify the magnitude of the sample prediction values, i.e., change a sample prediction value $v_{ij}$ into $v_{ij}$+offset.

In a particular embodiment, the first magnitude modification is a first magnitude modification of the average sample prediction value in the first prediction block 20 and the second magnitude modification is a second magnitude modification of the average sample prediction value in the second prediction block 30. In other words, the first and second magnitude modifications modify the average sample prediction values in the prediction blocks 20, 30.

Thus, the first and second magnitude modification does not necessarily have to, but could, modify the magnitude of the sample prediction values of all samples in the first and second prediction block 20, 30. However, the modification as applied to at least one, typically multiple, of the samples in the prediction blocks 20, 30 will change the average sample prediction value of the prediction block 20, 30.

FIG. 5 is a flow chart illustrating an additional, optional step of the deblocking filtering control method. In this embodiment, the first magnitude modification of sample prediction values and the second magnitude modification of sample prediction values are compared in step S10. The method then continues to step S1 in FIG. 4. In this embodiment, step S1 comprises deciding whether to apply deblocking filtering to sample values in the sample block 2 and in the neighboring sample block 3 based on the comparison of the first magnitude modification of sample prediction values and the second magnitude modification of sample prediction values.

Thus, in this embodiment the two magnitude modifications are compared to each other and the decision whether to apply any deblocking filtering is then made based on the comparison, i.e., how much the first and second magnitude modifications differ from each other.

FIG. 6 is a flow chart illustrating a deblocking filtering control method according to another embodiment. In an optional step S20, the difference between the first magnitude modification of sample prediction values and the second magnitude modification of sample prediction values is compared to a threshold value (T). If the first magnitude modification of sample prediction values differ from the second magnitude modification of sample prediction values with at least the threshold value the method continues to step S21. This step S21 comprises deciding that deblocking filtering may be applied to the sample values in the sample block 2 and in the neighboring sample block 3. However, if the first magnitude modification of sample prediction values does not differ from the second magnitude modification of sample prediction values with at least the threshold value the method instead continues to step S22. Step S22 comprises deciding not to apply deblocking filtering to the sample values in the sample block 2 and in the neighboring sample block 3.

Thus, if the difference between the first and second magnitude modifications is large, i.e., equal to or larger than the threshold value, then deblocking filtering may be applied and otherwise no deblocking filtering should be applied. The difference could be a simple difference, i.e., ($MM_P$–$MM_Q$); an absolute difference, i.e., |$MM_P$–$MM_Q$|; or a squared difference, i.e., ($MM_P$–$MM_Q$)$^2$ between the first magnitude modification of sample prediction values ($MM_P$) and the second magnitude modification of sample prediction values ($MM_Q$). In the latter two cases, only the magnitudes of $MM_P$ and $MM_Q$ are of relevance and not the signs.

In another embodiment, the method continues from step S20 to step S21 if the difference between the first and second magnitude modifications of sample prediction values is larger than a threshold value and otherwise continues to step S22.

In a particular embodiment, the threshold value is 1. In another particular embodiment, the threshold value is 2. Optionally, the threshold value could be larger for larger bit-depth.

Instead of calculating a difference between the magnitude modifications in step S20, a quotient between the magnitude modifications could be calculated, such as $MM_P$/$MM_Q$ or $MM_Q$/$MM_P$. In such a case, if the quotient is one or close to one, i.e., $\geq T_{min}$ but $\leq T_{max}$ or $>T_{min}$ but $<T_{max}$, wherein $T_{min}<1$ and $T_{max}>1$, then the method continues from step S20 to step S22, otherwise the method continues from step S20 to step S21.

As was mentioned in the foregoing, in HEVC a boundary strength $B_S$ parameter is used in the decision of whether to apply deblocking filtering or not. Generally, if $B_S$ is larger than 0, typically 1 or 2, then deblocking filtering may be applied but if $B_S$ is equal to 0 then no deblocking filtering is applied.

The present embodiments can be used to set the value of the boundary strength $B_S$ in the deblocking filtering control method. Such an embodiment is shown in FIG. 7. In this embodiment, step S30 comprises determining a value of a boundary strength parameter based on the first magnitude modification of sample prediction values and the second magnitude modification of sample prediction values. The method then continues to step S1 in FIG. 4. In this embodiment, step S1 comprises deciding whether to apply deblocking filtering to the sample values in the sample block 2 and in the neighboring sample block 3 based on the value of the boundary strength parameter.

This embodiment can be combined with the embodiments shown in FIGS. 5 and 6. Thus, the value of the boundary strength parameter is determined based on a comparison of the first magnitude modification of sample prediction values and the second magnitude modification of sample prediction values as performed in step S10 in FIG. 5. Correspondingly, in an embodiment step S21 of FIG. 6 comprises setting the boundary strength parameter to a value larger than 0 and then deciding that deblocking filtering may be applied since the boundary strength parameter has a value larger than 0. Step S22 then preferably comprises setting the boundary strength parameter to 0 and thereby deciding not to apply deblocking filtering.

In a particular embodiment, the boundary strength parameter is initialized to 0. Then, the criterion as shown in step S20 is checked and if it is met the value of the boundary strength parameter is set to a larger value than 0, such as 1. However, if the criterion is not met, no change of the initial value of the boundary strength is made. Thus, in such an embodiment, step S22 comprises keeping the boundary strength parameter value of 0 and thereby deciding not to apply deblocking filtering.

The determination of the value of the boundary strength parameter based on the magnitude modifications according to the embodiments can be combined with the previously described criteria relating to HEVC with regard to setting the value of the boundary strength parameter.

In such an embodiment, the boundary strength parameter $B_S$ is determined to be larger than 0 when any of the following criteria is met:

At least one of the two sample blocks 2, 3 uses intra prediction as prediction mode.

The two sample blocks 2, 3 use different number of motion vectors 21, 31 and/or different number of reference pictures 10.

The two sample blocks 2, 3 use different reference pictures 10.

The two sample blocks 2, 3 use the same reference picture 10 but the difference between the motion vectors 21, 31 is equal to or larger than a threshold value of 4 either in the horizontal or vertical direction.

The difference between magnitude modifications of sample prediction values in the prediction blocks 20, 30 for the two sample blocks 2, 3 is equal to or larger than a threshold value.

In a particular embodiment, the boundary strength parameter $B_S$ is set to 2 if the first criterion above is met, i.e., at least one of the two sample blocks 2, 3 uses intra prediction as prediction mode, set to 1 if any of the other criteria is met and is otherwise set to 0 if none of the criteria is met. In this particular embodiment, the criterion relating to magnitude modifications is an extra criterion added to the list of four criteria.

Generally, deblocking filtering may be applied to luma values in a sample block 2 and luma values in a neighboring sample block 3 if the boundary strength parameter $B_S$ has a value of 1 or 2. Deblocking filtering may be applied to chroma values in the sample block 2 and chroma values in the neighboring sample block 3 if the boundary strength parameter $B_S$ has a value of 2. No deblocking filtering is applied to either luma or chroma values if the boundary strength parameter $B_S$ has a value of 0.

Thus, in this particular embodiment, if the criterion of the embodiments, i.e., the criterion based on the magnitude modification of sample prediction values in the prediction blocks 20, 30, is met the boundary strength parameter $B_S$ is set to 1 and deblocking filtering may be applied to luma values in the sample block 2 and luma values in the neighboring sample block 3. However, in an embodiment, no deblocking filtering is applied to the chroma values since the boundary strength parameter $B_S$ has the value 1 and not 2.

In another particular embodiment, the boundary strength parameter $B_S$ is set to 2 if the first criterion above is met, set to 1 if any of the second to fourth criterion but not the fifth criterion is met, set to 2 if any of the second to fourth criterion and the fifth criterion is met and otherwise set to 0. In this particular embodiment, the fifth criterion relating to magnitude modifications is an extra criterion that is checked when any of the three criteria relating to inter-prediction is met. The fifth criterion is then used to determine whether to set the boundary strength parameter $B_S$ to a value of 1 or 2. This means that the fifth criterion is used to decide whether to apply deblocking filtering to only luma values in the sample block 2 and the neighboring sample block or to both luma and chroma values in the sample block 2 and the neighboring sample block 3.

In a particular embodiment, the fifth and last criterion is defined as:

The two sample blocks 2, 3 use the same reference picture 10, the difference between the motion vectors 21, 31 is smaller than the threshold value of 4 both in the horizontal direction and in the vertical direction and the difference between magnitude modifications of sample prediction values in the prediction blocks 20, 30 for the two sample blocks 2, 3 is equal to or larger than a threshold value.

Thus, in this particular embodiment, the fifth criterion is merely checked and applied if none of the three other inter-prediction related criteria are met.

The magnitude modifications of sample prediction values is, in an embodiment, not only used to decide whether to apply deblocking filtering or not. In this embodiment, the magnitude modifications are also used to decide whether to apply strong deblocking filtering or weak deblocking filtering to the sample values in the sample block 2 and the neighboring sample block 3.

Generally, strong deblocking filtering filters sample values in the sample block 2 and the neighboring sample block 3 more heavily as compared to weak deblocking filtering.

In such an embodiment, step S1 in FIG. 4 comprises deciding to apply deblocking filtering to the sample values in the sample block 2 and in the neighboring sample block 3 based on the first magnitude modification of sample prediction values and the second magnitude modification of sample prediction values. The method then continues to step S41 in FIG. 8. This step S41 comprises deciding whether to apply strong deblocking filtering or weak deblocking filtering to sample values in the sample block 2 and in the neighboring sample block 3 based on the first magnitude modification of sample prediction values and the second magnitude modification of sample prediction values.

In HEVC, the strong deblocking filtering is applied to the sample values if the following conditions are met, otherwise the weak deblocking filtering is applied, see FIG. 2:

$$2 \times (|p2_i - 2p1_i + p0_i| + |q2_i - 2q1_i + q0_i|) < (\beta >> 2) = \frac{\beta}{4}$$

$$|p3_i - p0_i| + |q3_i - q0_i| < (\beta >> 3) = \frac{\beta}{8}$$

$$|p0_i - q0_i| < ((5 \times t_C + 1) >> 1) = 2.5 \times t_C, \text{ wherein } i = 0, 3.$$

In HEVC, the value of the parameters $\beta$, $t_C$ depend on the quantization parameter of the sample block 2 as shown in Table 8-11—Derivation of threshold variables $\beta'$ and $t_C'$ from input Q of [1]. More information of strong and weak deblocking filtering can be found in section 8.7.2.5.7 Filtering process for a luma sample in [1].

In an embodiment, the deblocking filtering control method comprises the additional, optional step S40 as shown in FIG. 9. This step S40 comprises determining a value of at least one parameter selected from a group consisting of $\beta$ and $t_C$ based on the first magnitude modification of sample prediction values and the second magnitude modification of sample prediction values. The deblocking filtering control method then continues to step S41 in FIG. 8. In this embodiment, step S41 comprises deciding to apply the strong deblocking filtering to the sample values in the sample block 2 and in the neighboring sample block 3 if $2\times(|p2_i-2p1_i+p0_i|+|q2_i-2q1_i+q0_i|)<(\beta>>2)$, $|p3_i-p0_i|+|q3_i-q0_i|<(\beta>>3)$ and $|p0_i-q0_i|<((5\times t_C+1)>>1)$, wherein i=0, 3, and otherwise deciding to apply the weak deblocking filtering to the sample values in the sample block 2 and in the neighboring sample block 3. With reference to FIG. 2, $p0_i$ denotes a sample value of a first sample, relative to the block boundary 4, in a line i of samples 5 in the sample block 2, $p1_i$ denotes a sample value of a second sample, relative to the block boundary 4, in the line i of samples 5 in the sample block 2, $p2_i$ denotes a sample value of a third sample, relative to the block boundary 4, in the line i of samples 5 in the sample block 2. Correspondingly, $q0_i$ denotes a sample value of a first sample, relative to the block boundary 4, in the line i of samples 5 in the neighboring sample block 3, $q1_i$ denotes a sample value of a second sample, relative to the block boundary 4, in the line i of samples 5 in the neighboring sample block 3, and $q2_i$ denotes a sample value of a third sample, relative to the block boundary 4, in the line i of samples 5 in the neighboring sample block 3.

In an embodiment, the value of the parameter β is determined in step S40 based on the magnitude modifications. In another embodiment, the value of the parameter $t_C$ is determined in step S40 based on the magnitude modifications. In a further embodiment, the values of the parameters β and $t_C$ are determined in step S40 based on the magnitude modifications.

In these embodiments, the value(s) of the parameter(s) β and/or $t_C$ could be determined solely based on the magnitude modifications or be determined at least partly based on the magnitude modifications. In the latter case, at least one other parameter is used determine the value(s) of the parameter(s) β and/or $t_C$. This at least one other parameter is preferably the quantization parameter of the sample block 2, such as the quantization parameter Q listed in Table 8-11—Derivation of threshold variables β' and $t_C$' from input Q in [1].

For instance, the value(s) of the parameter(s) β and/or $t_C$ could be determined based on the difference or quotient between the first magnitude modification and the second magnitude modification. Generally, the larger the difference between the first and second magnitude modification the higher the value(s) of the parameter(s) β and/or $t_C$. This in turn implies that strong deblocking filtering is more likely to be selected for the sample block 2 and the block boundary 4 as compared to having lower value(s) of the parameter(s) β and/or $t_C$.

Alternatively, initial values of the parameters β and $t_C$ could be determined based on, for instance, the quantization parameter. The initial values may then be modified or adjusted based on the magnitude modifications. For instance, the parameter $β=β_I+β_M$ or $β=β_M×β_I$, wherein $β_I$ denotes the initial value of the parameter β and $β_M$ denotes the modification applied to the initial value and determined based on the magnitude modifications. The same principle can be applied to the parameter $t_C$. In such a case, the modification to the parameter(s) β and/or $t_C$ is generally larger for a larger difference between the first and second magnitude modifications.

Figure 10:
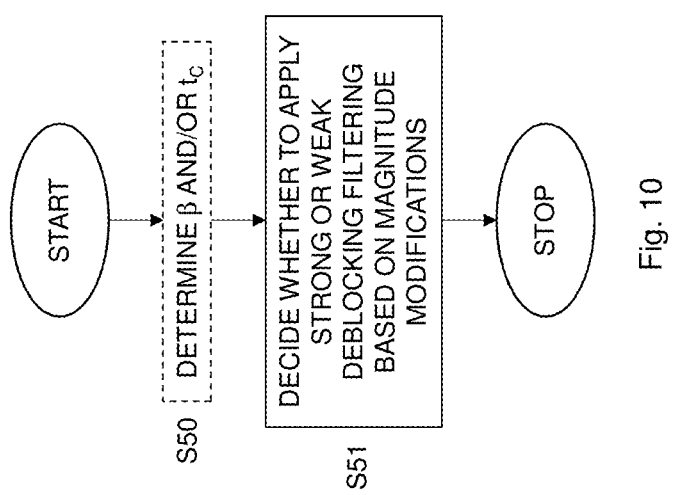
FIG. 10 is a flow chart illustrating a deblocking filtering control method according to a further embodiment.

The decision to apply strong or weak deblocking filtering based on the magnitude modifications can be used independently of deciding whether to apply deblocking filtering or not based on the magnitude modifications. This embodiment is illustrated in the flow chart of FIG. 10. Thus, an embodiment relates to a deblocking filtering control method. The deblocking filtering control method comprises deciding, in step S51, whether to apply strong deblocking filtering or weak deblocking filtering to sample values in a sample block 2 in a picture 1 and in a neighboring sample block 3 in the picture 1 based on i) a first magnitude modification of sample prediction values in a first prediction block 20 in a reference picture 10 for the sample block 2 and ii) a second magnitude modification of sample prediction values in a second prediction block 20 in the reference picture 10 for the neighboring sample block 3. The sample block 2 and the neighboring sample block 3 are separated in the picture 1 by a block boundary 4.

In an embodiment, the deblocking filtering control method also comprises step S50. This step S50 comprises determining a value of at least one parameter selected from a group consisting of β and $t_C$ based on the first magnitude modification of sample prediction values and the second magnitude modification of sample prediction values. The deblocking filtering control method then continues to step S51. In this embodiment, step S51 comprises deciding to apply the strong deblocking filtering to the sample values in the sample block 2 and in the neighboring sample block 3 if $2×(|p2_i-2p1_i+p0_i|+|q2_i-2q1_i+q0_i|)<(β>>2)$, $|p3_i-p0_i|+|q3_i-q0_i|<(β>>3)$ and $|p0_i-q0_i|<((5×t_C+1)>>1)$, wherein i=0, 3, and otherwise deciding to apply the weak deblocking filtering to the sample values in the sample block 2 and in the neighboring sample block 3.

In an embodiment, step S1 of FIG. 4 comprises deciding whether to apply deblocking filtering to the sample values in the sample block 2 and in the neighboring sample block 3 based on the first magnitude modification of sample prediction values, the second magnitude modification of sample prediction values, an average value of the sample values in the sample block 2 and an average value of the sample values in the neighboring sample block 3.

Thus, in this embodiment the decision of whether to apply deblocking filtering or not are not based only on the magnitude modifications but also on the average sample values in the sample block 2 and in the neighboring sample block 3. For instance, there are possibilities that the difference between average sample values, such as difference between average luma values, of the sample block 2 and the neighboring sample block 3 is large, which makes it difficult to decide whether the large difference in average sample values is caused by the prediction process, in which case deblocking filtering should be applied, or is coming from the properties of the original video signal, in which case no deblocking filtering should be applied. Thus, if the difference between average sample values exceeds a defined threshold then deblocking filtering should not be applied.

In a particular embodiment, the defined threshold has a value equal to a scaling of the parameter $t_C$, i.e., $γ×t_C$, wherein γ is a positive integer value, preferably selected within a range of 1 to 20, such as 1, 2, 3, 4, 5, 6, 7, 8, 9, 10, 11, 12, 13, 14, 15, 16, 17, 18, 19 or 20.

The average sample value could be calculated for all samples in the sample block 2 and the neighboring sample block 3, or for a sub-portion thereof, such as based on the sample values of samples in one or more selected lines 5 of samples in the sample block 2 and the neighboring sample block 3.

In a particular embodiment, two differences are thereby calculated, a first difference between the first and second magnitude modifications and a second difference between the average sample values. In such a case, deblocking filtering is applied to sample values in the sample block 2 and in the neighboring sample block 3 if the first difference is equal to or above a first threshold value but the second difference is equal to or below a second threshold value, otherwise no deblocking filtering is applied.

Hence, in an embodiment step S1 comprises deciding, if a difference between the average value of the sample values in the sample block 2 and the average value of the sample values in the neighboring sample block 3 is equal to or smaller than a threshold value, whether to apply deblocking filtering to the sample values in the sample block 2 and in the neighboring sample block 3 based on the first magnitude modification of sample prediction values and the second magnitude modification of sample prediction values.

Overlapped Block Motion Compensation (OBMC) is a technique used to avoid blocking artifacts. When using OBMC, sample blocks are typically twice as large in each dimension and overlap quadrant-wise with all eight neighboring sample blocks. Thus, each sample belongs to four sample blocks. In such a scheme, there are four predictions for each sample which are summed up to a weighted mean. For this purpose, sample blocks are associated with a window function that has the property that the sum of four overlapped windows is equal to one everywhere. This means that in OBMC a sample block is predicted based not only on its motion vector but also the motion vectors of neighboring sample blocks. Accordingly, in an embodiment the decision to apply deblocking filtering based on the magnitude modifications is disabled if the sample block 2 and/or the neighboring sample block 3 is predicted using OBMC.

Hence, in an embodiment step S1 of FIG. 4 comprises deciding, if none of the sample block 2 and the neighboring sample block 3 is predicted using OBMC, whether to apply deblocking filtering to the sample values in the sample block 2 and in the neighboring sample block 3 based on the first magnitude modification of sample prediction values and the second magnitude modification of sample prediction values.

There is a special inter prediction case generally denoted weighted prediction in the art. It is a tool useful for tackling fades inside a video sequence. In a situation with fades, the luminance and luma level changes across several pictures. In such cases, the sensible way of performing inter prediction is to first align the average luma level between the current picture 1 and its corresponding reference picture 10. This adjustment is realized by using a linear function model: $Y'_{after} = \text{weight} \times Y'_{before} + \text{offset}$. The weighted prediction parameters weight and offset are typically determined on the encoder side and signaled in the bitstream to the decoder. There are different ways of determining the weighted prediction parameters. In a typical embodiment, the weighted prediction parameters are determined based on the mean (average) and variance luma difference between the current picture 1 and the reference picture 10. For instance, weight=$\sqrt{\text{variance}_C/\text{variance}_R}$, wherein variance$_C$ denotes the variance in luma Y' for the current picture 1 and variance$_R$ denotes the variance in luma Y' for the reference picture 10. Correspondingly, offset=mean$_C$–weight×mean$_R$, wherein mean$_C$ denotes the average luma Y' in the current picture 1 and mean$_R$ denotes the average luma Y' in the reference picture 10. A decoder then decodes these weighted prediction parameters from the bitstream and uses them to adjust luma levels of the prediction blocks 20, 30 when performing inter prediction.

The following table shows the weighted prediction parameters syntax specified in HEVC in bold, see also section 7.3.6.3 Weighted prediction parameters syntax in [1]. The weighted prediction parameters are specified per reference picture 10 for each reference picture list, i.e., list 0 (l0) and list 1 (l1).

```
pred_weight_table( ) {
    ...
    for( i = 0; i <= num_ref_idx_l0_active_minus1; i++ )
        luma_weight_l0_flag[ i ]
    ...
    for( i = 0; i <= num_ref_idx_l0_active_minus1; i++ ) {
        if( luma_weight_l0_flag[ i ] ) {
            delta_luma_weight_l0[ i ]
            luma_offset_l0[ i ]
        }
        ...
    }
```

-continued

```
    if( slice_type = = B ) {
        for( i = 0; i <= num_ref_idx_l1_active_minus1; i++ )
            luma_weight_l1_flag[ i ]
        ...
        for( i = 0; i <= num_ref_idx_l1_active_minus1; i++ ) {
            if( luma_weight_l1_flag[ i ] ) {
                delta_luma_weight_l1[ i ]
                luma_offset_l1[ i ]
            }
            ...
        }
    }
}
```

When weighted prediction is used, it is not always beneficial to have a reference picture list that only contains unique reference picture. As there might be some sample blocks that experience different levels of luma change as compared to other sample blocks. A typical scenario is an in-door music show where lots of flashes happens on the main stage but not so much elsewhere. In this case, having the possibility of applying different weighted prediction parameters for the same reference picture is desired. A solution is to duplicate a reference picture in a reference picture list. In such a case, the encoder can signal different weighted prediction parameters for the same reference picture. The switching of weighted prediction parameters can then be simply done by just switching reference picture index.

In an embodiment, the first and second magnitude modifications of sample prediction values in the first and second prediction blocks 20, 30 are weighted prediction parameters, such as the above mentioned weight, i.e., delta_luma_weight_l0[i] or delta_luma_weight_l1[i], or offset, i.e., luma_offset_l0[i] or luma_offset_l1[i].

Thus, in an embodiment step S1 of FIG. 4 comprises deciding whether to apply deblocking filtering to the sample values in the sample block 2 and in the neighboring sample block 3 based on i) a value of a first weighted prediction parameter for the first prediction block 20 and ii) a value of a second weighted prediction parameter for the second prediction block 30.

In a particular embodiment, the first and second weighted prediction parameters are weighting factors, i.e., the parameter weight e.g., the parameter delta_luma_weight_l0[i] and/or delta_luma_weight_l1[i]. In such a particular embodiment, step S1 comprises deciding whether to apply deblocking filtering to the sample values in the sample block 2 and in the neighboring sample block 3 based on i) a value of a first weighting factor for the sample prediction values of the first prediction block 20 and ii) a value of a second weighting factor for the sample prediction values of the second prediction block 30.

Note that at least one of the weighting factors may be equal to one, i.e., corresponding to no weighting at all.

In another particular embodiment, the first and second weighted prediction parameters are additive offsets, i.e., the parameter offset, e.g., the parameter luma_offset_l0[i] and/or luma_offset_l1[i]. In this particular embodiment, step S1 comprises deciding whether to apply deblocking filtering to the sample values in the sample block 2 and in the neighboring sample block 3 based on i) a value of a first additive offset for the sample prediction values of the first prediction block 20 and ii) a value of a second additive offset for the sample prediction values of the second prediction block 30.

Note that at least one of the additive offsets may be equal to zero, i.e., corresponding to no additive offset at all.

In these embodiments, the sample values and the sample prediction values are preferably luma values.

In addition to weighted prediction, Local Illumination Compensation (LIC) is another approach for tackling inhomogeneous illuminance or luma change inside a picture. LIC is also based on a linear model. The difference compared to weighted prediction is that the LIC parameters are adaptively set or derived for each prediction block. More information of LIC and illumination compensation can be found in section I.8.5.3.3.2 Illumination compensated sample prediction process in [1], in which the LIC parameters include LIC weighting factors, icWeightL0 and icWeightL1, specifying weights for illumination compensation, and LIC additive offsets, icOffsetL0 and icOffsetL1 specifying offsets for illumination compensation.

Hence, in an embodiment step S1 of FIG. 4 comprises deciding whether to apply deblocking filtering to the sample values in the sample block 2 and in the neighboring sample block 3 based on i) a value of a first LIC parameter for the first prediction block 20 and ii) a value of a second LIC parameter for the second prediction block 30.

In a particular embodiment, the first and second LIC parameters are LIC weighting factors, e.g., the parameter icWeightL0 and/or icWeightL1. In such a particular embodiment, step S1 comprises deciding whether to apply deblocking filtering to the sample values in the sample block 2 and in the neighboring sample block 3 based on i) a value of a first LIC weighting factor for the sample prediction values of the first prediction block 20 and ii) a value of a second LIC weighting factor for the sample prediction values of the second prediction block 30.

Note that at least one of the LIC weighting factors may be equal to one, i.e., corresponding to no weighting at all.

In another particular embodiment, the first and second LIC parameters are LIC additive offsets, e.g., the parameter icOffsetL0 and/or icOffsetL1. In this particular embodiment, step S1 comprises deciding whether to apply deblocking filtering to the sample values in the sample block 2 and in the neighboring sample block 3 based on i) a value of a first LIC additive offset for the sample prediction values of the first prediction block 20 and ii) a value of a second LIC additive offset for the sample prediction values of the second prediction block 30.

Note that at least one of the LIC additive offsets may be equal to zero, i.e., corresponding to no additive offset at all.

In these embodiments, the sample values and the sample prediction values are preferably luma values.

Adaptive Interpolation Filtering (AIF) is a technique that applies different interpolation filters for different pictures in a video sequence. The filter coefficients are usually estimated for each picture independently. In such a way, the temporal redundancy within the video sequence gets further diminished as the filter coefficients are finer tuned locally and are a better fit for the video content inside each picture.

In the context of AIF, interpolation filters with different gains and/or offsets may be used for the first and second prediction blocks 20, 30. In such a case, different scaling and/or additive offsets are applied to the sample prediction values in the first prediction block 20 as compared to the sample prediction values in the second prediction block 30.

A typical n-tap filter could be defined as $[c_1 \ldots c_n]/C$. In such a case, the filter coefficients $c_1/C, \ldots, c_n/C$ typically sum up to unity, i.e., $(c_1 + \ldots + c_n)/C = 1$.

The prediction sample values of the first and second prediction blocks 20, 30 will, however, be scaled differently if the interpolation filters determined for the two prediction blocks 20, 30 have different gains, i.e., not summing up to unity. This in turn means that the magnitude of the sample prediction values will be modified, i.e., scaled, by the filter gain.

Thus, in an embodiment step S1 of FIG. 4 comprises deciding whether to apply deblocking filtering to the sample values in the sample block 2 and in the neighboring sample block 3 based on i) a value of a first filter parameter of a first interpolation filter for the first prediction block 20 and ii) a value of a second filter parameter of a second interpolation filter for the second prediction block 30.

In a particular embodiment, step S1 comprises deciding whether to apply deblocking filtering to the sample values in the sample block 2 and in the neighboring sample block 3 based on i) a value of a first filter gain of the first interpolation filter and ii) a value of a second filter gain of the second interpolation filter.

In an embodiment, the filter coefficients of the first interpolation filter do not sum up to unity and the filter coefficients of the second interpolation filter do not sum up to unity.

In a particular embodiment, the first interpolation filter is a first adaptive interpolation filter and the second interpolation filter is a second adaptive interpolation filter.

Another aspect of the embodiments relates to a deblocking filtering control device. The deblocking filtering control device is configured to decide whether to apply deblocking filtering to sample values in a sample block in a picture and in a neighboring sample block in the picture based on i) a first magnitude modification of sample prediction values in a first prediction block in a reference picture for the sample block and ii) a second magnitude modification of sample prediction values in a second prediction block in the reference picture for the neighboring sample block. The sample block and the neighboring sample block are separated in the picture by a block boundary.

In an embodiment, the deblocking filtering control device is configured to compare the first magnitude modification of sample prediction values and the second magnitude modification of sample prediction values. The deblocking filtering control device is also configured, in this embodiment, to decide whether to apply deblocking filtering to the sample values in the sample block and in the neighboring sample block based on the comparison of the first magnitude modification of sample prediction values and the second magnitude modification of sample prediction values.

In a particular embodiment, the deblocking filtering control device is configured to decide that deblocking filtering may be to the sample values in the sample block and in the neighboring sample block if the first magnitude modification of sample prediction values differs from the second magnitude modification of sample prediction values with at least a threshold value. The deblocking filtering control device is also configured to decide not to apply deblocking filtering to the sample values in the sample block and in the neighboring sample block if the first magnitude modification of sample prediction values does not differ from the second magnitude modification of sample prediction values with at least the threshold value.

In an embodiment, the deblocking filtering control device is configured to determine a value of a boundary strength parameter based on the first magnitude modification of sample prediction values and the second magnitude modification of sample prediction values. The deblocking filtering control device is also configured to decide whether to apply deblocking filtering to the sample values in the sample block and in the neighboring sample block based on the value of the boundary strength parameter.

In an embodiment, the deblocking filtering control device is configured to decide to apply deblocking filtering to the sample values in the sample block and in the neighboring sample block based on the first magnitude modification of sample prediction values and the second magnitude modification of sample prediction values. The deblocking filtering control device is also configured to decide whether to apply strong deblocking filtering or weak deblocking filtering to the sample values in the sample block and in the neighboring sample block based on the first magnitude modification of sample prediction values and the second magnitude modification of sample prediction values.

In an embodiment, the deblocking filtering control device is configured to determine a value of at least one parameter selected from a group consisting of $\beta$ and $t_C$ based on the first magnitude modification of sample prediction values and the second magnitude modification of sample prediction values. The deblocking filtering control device is also configured to decide to apply the strong deblocking filtering to the sample values in the sample block and in the neighboring sample block if if $2\times(|p2_i-2p1_i+p0_i|+|q2_i-2q1_i+q0_i|)<(\beta>>2)$, $|p3_i-p0_i|+|q3_i-q0_i|<(\beta>>3)$ and $|p0_i-q0_i|<((5\times t_C+1)>>1)$, wherein i=0, 3, and otherwise decide to apply the weak deblocking filtering to the sample values in the sample block and in the neighboring sample block.

In an embodiment, the deblocking filtering control device is configured to decide whether to apply deblocking filtering to the sample values in the sample block and in the neighboring sample block based on the first magnitude modification of sample prediction values, the second magnitude modification of sample prediction values, an average value of the sample values in the sample block and an average value of the sample values in the neighboring sample block.

In a particular embodiment, the deblocking filtering control device is configured to decide, if a difference between the average value of the sample values in the sample block and the average value of the sample values in the neighboring sample block is equal to or smaller than a threshold value, whether to apply deblocking filtering to the sample values in the sample block and in the neighboring sample block based on the first magnitude modification of sample prediction values and the second magnitude modification of sample prediction values.

In an embodiment, the deblocking filtering control device is configured to decide, if none of the sample block and the neighboring sample block is predicted using OBMC, whether to apply deblocking filtering to the sample values in the sample block and in the neighboring sample block based on the first magnitude modification of sample prediction values and the second magnitude modification of sample prediction values.

In an embodiment, the deblocking filtering control device is configured to decide whether to apply deblocking filtering to the sample values in the sample block and in the neighboring sample block based on i) a value of a first weighted prediction parameter for the first prediction block and ii) a value of a second weighted prediction parameter for the second prediction block.

In a particular embodiment, the deblocking filtering control device is configured to decide whether to apply deblocking filtering to the sample values in the sample block and in the neighboring sample block based on i) a value of a first weighting factor for the sample prediction values of the first prediction block and ii) a value of a second weighting factor for the sample prediction values of the second prediction block.

In another particular embodiment, the deblocking filtering control device is configured to decide whether to apply deblocking filtering to the sample values in the sample block and in the neighboring sample block based on i) a value of a first additive offset for the sample prediction values of the first prediction block and ii) a value of a second additive offset for the sample prediction values of the second prediction block.

In an embodiment, the deblocking filtering control device is configured to decide whether to apply deblocking filtering to the sample values in the sample block and in the neighboring sample block based on i) a value of a first LIC parameter for the first prediction block and ii) a value of a second LIC parameter for the second prediction block.

In a particular embodiment, the deblocking filtering control device is configured to decide whether to apply deblocking filtering to the sample values in the sample block and in the neighboring sample block based on i) a value of a first LIC weighting factor for the sample prediction values of the first prediction block and ii) a value of a second LIC weighting factor for the sample prediction values of the second prediction block.

In another particular embodiment, the deblocking filtering control device is configured to decide whether to apply deblocking filtering to the sample values in the sample block and in the neighboring sample block based on i) a value of a first LIC additive offset for the sample prediction values of the first prediction block and ii) a value of a second LIC additive offset for the sample prediction values of the second prediction block.

In an embodiment, the deblocking filtering control device is configured to decide whether to apply deblocking filtering to the sample values in the sample block and in the neighboring sample block based on i) a value of a first filter parameter of a first interpolation filter for the first prediction block and ii) a value of a second filter parameter of a second interpolation filter for the second prediction block.

In a particular embodiment, the deblocking filtering control device is configured to decide whether to apply deblocking filtering to the sample values in the sample block and in the neighboring sample block based on i) a value of a first filter gain of the first interpolation filter and ii) a value of a second filter gain of the second interpolation filter.

A further aspect of the embodiments relates to a deblocking filtering control device. The deblocking filtering control device is configured to decide whether to apply strong deblocking filtering or weak deblocking filtering to a sample values in a sample block in a picture and in a neighboring sample block in the picture based on i) a first magnitude modification of sample prediction values in a first prediction block in a reference picture for the sample block and ii) a second magnitude modification of sample prediction values in a second prediction block in the reference picture for the neighboring sample block. In an embodiment, the sample block and the neighboring sample block are separated in the picture by a block boundary.

In an embodiment, the deblocking filtering control device is configured to determine a value of at least one parameter selected from a group consisting of $\beta$ and $t_C$ based on the first magnitude modification of sample prediction values and the second magnitude modification of sample prediction values. The deblocking filtering control device is also configured to decide to apply the strong deblocking filtering to the sample values in the sample block and in the neighboring sample block if $2\times|p2_i-2p1_i+p0_i|<(\beta>>2)$, $|p3_i-p0_i|+|q3_i-q0_i|<(\beta>>3)$ and $|p0_i-q0_i|<((5\times t_C+1)>>1)$, wherein i=0, 3, and otherwise decide to apply the weak deblocking filtering to the sample values in the sample block and in the neighboring sample block.

An embodiment relates to a video encoder comprising a deblocking filtering control device.

FIG. 11 is a schematic block diagram of a video encoder 40 according to an embodiment.

A current sample block is predicted by performing a motion estimation by a motion estimator 50 from already encoded and reconstructed sample block(s) in the same picture and/or in reference picture(s). The result of the motion estimation is a motion vector in the case of inter prediction. The motion vector is utilized by a motion compensator 50 for outputting an inter prediction of the sample block.

An intra predictor 49 computes an intra prediction of the current sample block. The outputs from the motion estimator/compensator 50 and the intra predictor 49 are input in a selector 51 that either selects intra prediction or inter prediction for the current sample block. The output from the selector 51 is input to an error calculator in the form of an adder 41 that also receives the sample values of the current sample block. The adder 41 calculates and outputs a residual error as the difference in sample values between the sample block and its prediction, i.e., prediction block.

The error is transformed in a transformer 42, such as by a discrete cosine transform (DCT), and quantized by a quantizer 43 followed by coding in an encoder 44, such as by an entropy encoder. In inter coding, also the estimated motion vector is brought to the encoder 44 for generating the coded representation of the current sample block.

The transformed and quantized residual error for the current sample block is also provided to an inverse quantizer 45 and inverse transformer 46 to reconstruct the residual error. This residual error is added by an adder 47 to the prediction output from the motion compensator 50 or the intra predictor 49 to create a reconstructed sample block that can be used as prediction block in the prediction and coding of other sample blocks. This reconstructed sample block is first processed by a deblocking filtering control device 100 according to the embodiments in order to control any deblocking filtering that is applied to the reconstructed sample block to combat any artefact. The processed reconstructed sample block is then temporarily stored in a Decoded Picture Buffer (DPB) 48, where it is available to the intra predictor 49 and the motion estimator/compensator 50.

An embodiment relates to a video decoder comprising a deblocking filtering control device.

Figure 12:
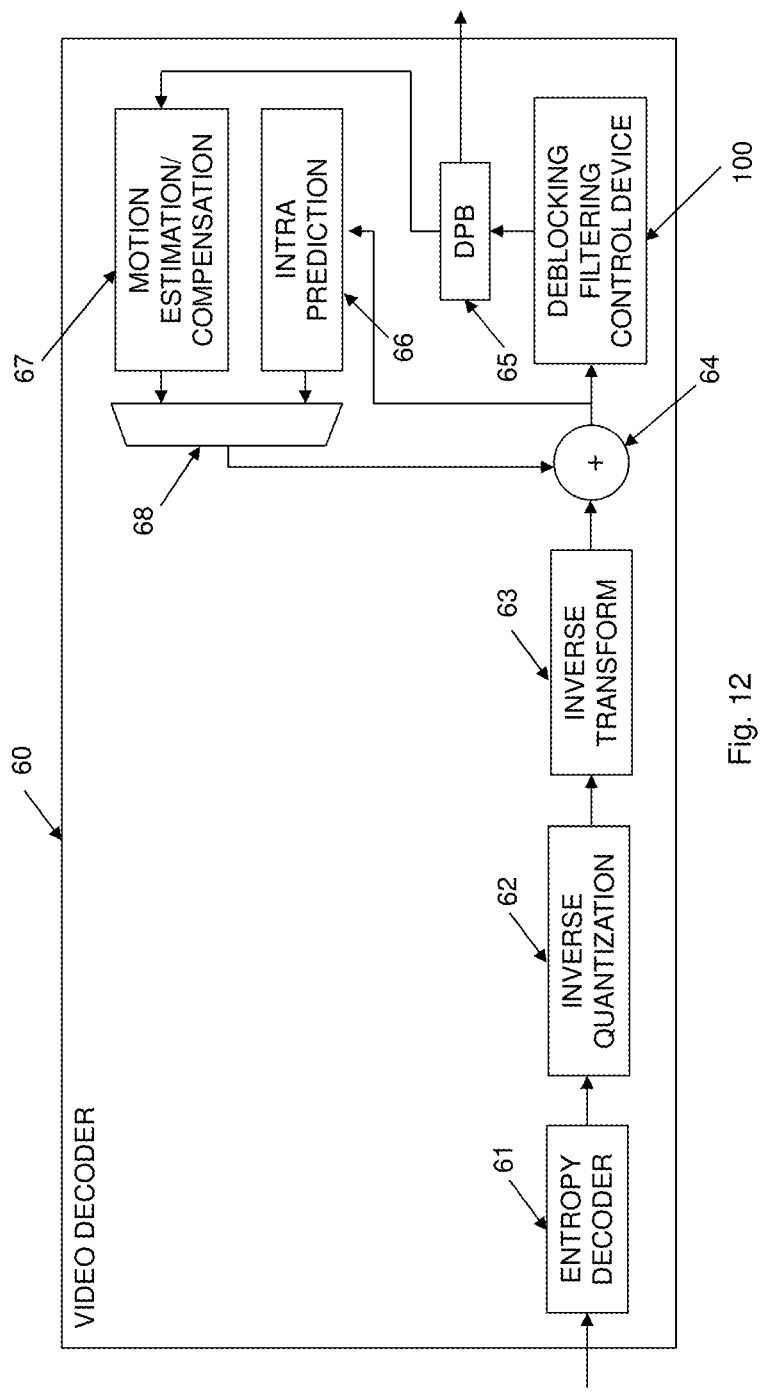
FIG. 12 is a schematic block diagram of a video decoder according to an embodiment.

FIG. 12 is a schematic block diagram of a video decoder 60 comprising a deblocking filtering control device 100 according to the embodiments. The video decoder 60 comprises a decoder 61, such as entropy decoder, for decoding a bitstream comprising an encoded representation of a sample block to get a quantized and transformed residual error. The residual error is dequantized in an inverse quantizer 62 and inverse transformed by an inverse transformer 63 to get a decoded residual error.

The decoded residual error is added in an adder 64 to the sample prediction values of a prediction block. The prediction block is determined by a motion estimator/compensator 67 or intra predictor 66, depending on whether inter or intra prediction is performed. A selector 68 is thereby interconnected to the adder 64 and the motion estimator/compensator 67 and the intra predictor 66. The resulting decoded sample block output from the adder 64 is input to a deblocking filtering control device 100 in order to control any deblocking filtering that is applied to combat any artefacts. The filtered sample block enters a DPB 65 and can be used as prediction block for subsequently decoded sample blocks. The DPB 65 is thereby connected to the motion estimator/compensator 67 to make the stored sample blocks available to the motion estimator/compensator 67. The output from the adder 64 is preferably also input to the intra predictor 66 to be used as an unfiltered prediction block. The filtered sample block is furthermore output from the video decoder 60, such as output for display on a screen.

In the embodiments disclosed in FIGS. 11 and 12 the deblocking filtering control device 100 controls deblocking filtering in the form of so called in-loop deblocking filtering. In an alternative implementation at the video decoder 60, the deblocking filtering control device 100 is arranged to perform so called post-processing deblocking filtering. In such a case, the deblocking filtering control device 100 operates on the output pictures outside of the loop formed by the adder 64, the DPB 65, the intra predictor 66, the motion estimator/compensator 67 and the selector 68.

FIG. 13 is a schematic block diagram illustrating an example of a deblocking filtering control device 100 based on a processor-memory implementation according to an embodiment. In this particular example, the deblocking filtering control device 100 comprises a processor 101, such as processing circuitry, and a memory 102. The memory 102 comprises instructions executable by the processor 101.

In an embodiment, the processor 101 is operative to decide whether to apply deblocking filtering to the sample values in the sample block and in the neighboring sample block based on the first magnitude modification of sample prediction values and the second magnitude modification of sample prediction values.

In another embodiment, the processor 101 is operative to decide whether to apply the strong deblocking filtering or the weak deblocking filtering to sample values in the sample block and in the neighboring sample block based on the first magnitude modification of sample prediction values and the second magnitude modification of sample prediction values.

Figure 16:
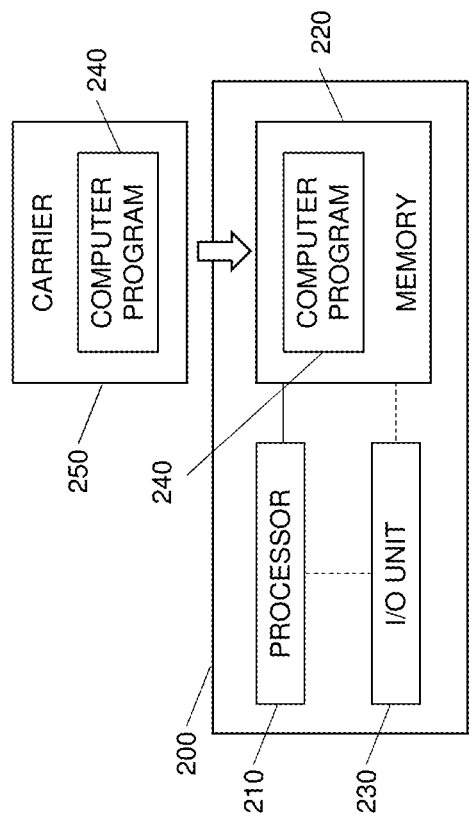
FIG. 16 schematically illustrate a computer program based implementation of an embodiment.

Optionally, the deblocking filtering control device 100 may also include a communication circuit, represented by an input/output (I/O) unit 103 in FIG. 16. The I/O unit 103 may include functions for wired and/or wireless communication with other devices and/or network nodes in a wired or wireless communication network. In a particular example, the I/O unit 103 may be based on radio circuitry for communication with one or more other nodes, including transmitting and/or receiving information. The I/O unit 103 may be interconnected to the processor 101 and/or memory 102. By way of example, the I/O unit 103 may include any of the following: a receiver, a transmitter, a transceiver, I/O circuitry, input port(s) and/or output port(s).

FIG. 14 is a schematic block diagram illustrating another example of a deblocking filtering control device 110 based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 15:
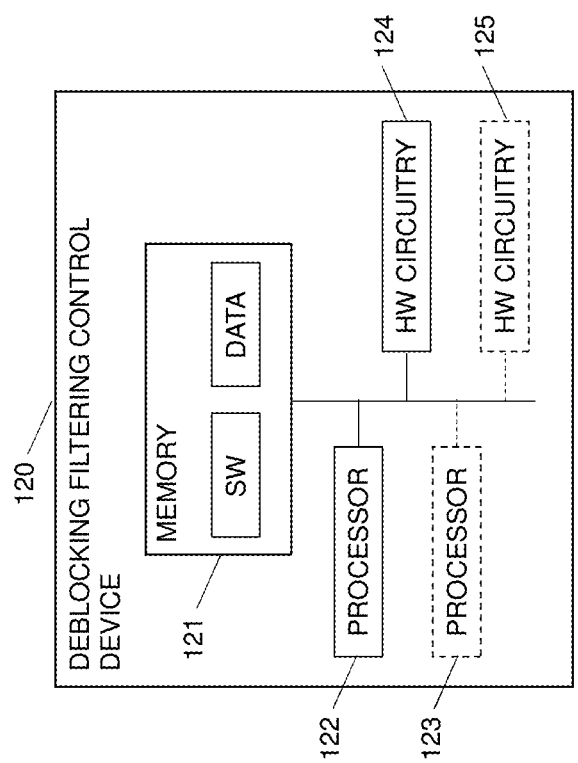
FIG. 15 is a schematic block diagram of a deblocking filtering control device according to a further embodiment.

FIG. 15 is a schematic block diagram illustrating yet another example of a deblocking filtering control device 120 based on combination of both processor(s) 122, 123 and hardware circuitry 124, 125 in connection with suitable memory unit(s) 121. The video insert control device 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

FIG. 16 is a schematic diagram illustrating an example of a deblocking filtering control device 200 according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O unit 230 may also be interconnected to the processor(s) 210 and/or the memory 220 to enable input and/or output of relevant data, such as reconstructed or decoded pictures of a video sequence.

The term 'processor' should be interpreted in a general sense as any circuitry, system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to decide whether to apply deblocking filtering to sample values in a sample block in a picture and in a neighboring sample block in the picture based on i) a first magnitude modification of sample prediction values in a first prediction block in a reference picture for the sample block and ii) a second magnitude modification of sample prediction values in a second prediction block in the reference picture for the neighboring sample block. The sample block and the neighboring sample block are separated in the picture by a block boundary.

In another particular embodiment, the computer program 240 comprises instructions, which when executed by at least one processor 210, cause the at least one processor 210 to decide whether to apply a strong deblocking filtering or a weak deblocking filtering to sample values in a sample block in a picture and in a neighboring sample block in the picture based on i) a first magnitude modification of sample prediction values in a first prediction block in a reference picture for the sample block and ii) a second magnitude modification of sample prediction values in a second prediction block in the reference picture for the neighboring sample block. The sample block and the neighboring sample block are separated in the picture by a block boundary.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a deblocking filtering control device 200 for execution by the processing circuitry 210 thereof.

The flow diagram or diagrams presented herein may be regarded as a computer flow diagram or diagrams, when performed by one or more processors. A corresponding deblocking filtering control device may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 17:
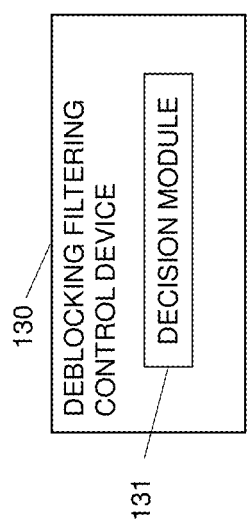
FIG. 17 is a schematic block diagram of a deblocking filtering control device according to yet another embodiment.

FIG. 17 is a schematic block diagram of a deblocking filtering control device 130 according to an embodiment. The deblocking filtering control device 130 comprises a decision module 131 for deciding whether to apply deblocking filtering to sample values in a sample block in a picture and in a neighboring sample block in the picture based on i) a first magnitude modification of sample prediction values in a first prediction block in a reference picture for the sample block and ii) a second magnitude modification of sample prediction values in a second prediction block in the reference picture for the neighboring sample block. The sample block and the neighboring sample block are separated in the picture by a block boundary.

In another embodiment, the deblocking filtering control device 130 comprises a decision module 131 for deciding whether to apply a strong deblocking filtering or a weak deblocking filtering to sample values in a sample block in a picture and in a neighboring sample block in the picture based on i) a first magnitude modification of sample prediction values in a first prediction block in a reference picture for the sample block and ii) a second magnitude modification of sample prediction values in a second prediction block in the reference picture for the neighboring sample block. The sample block and the neighboring sample block are separated in the picture by a block boundary.

A further embodiment relates to a user equipment or device comprising a deblocking filtering control device according to the embodiments, a video encoder according to the embodiments and/or a video decoder according to the embodiments. In a particular embodiment, the user equipment is selected from a group consisting of a video camera, a computer, a laptop, a smart phone, a tablet, a game console and a set-top box.

Figure 18:
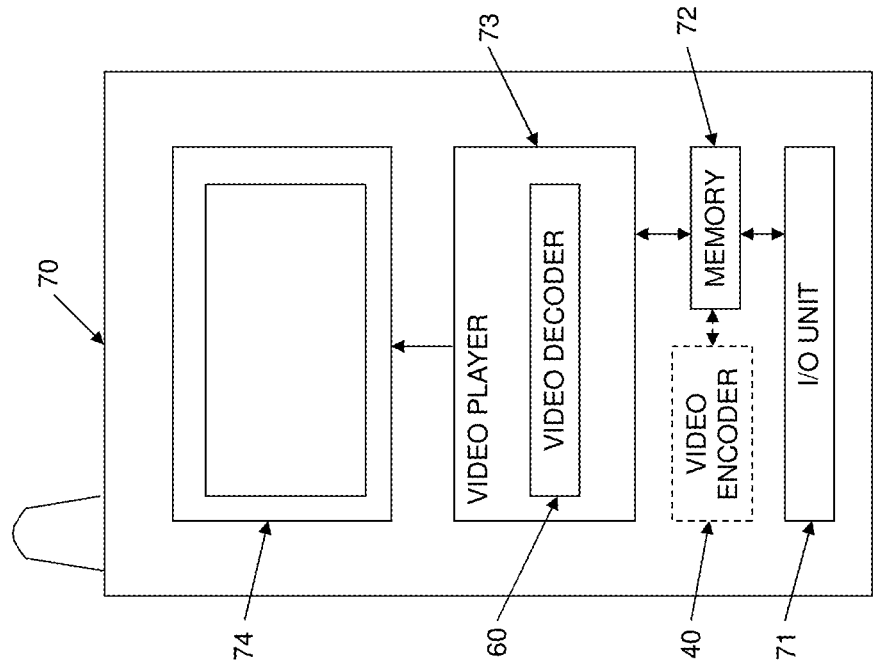
FIG. 18 is a schematic block diagram of a user equipment according to an embodiment.

FIG. 18 is a schematic block diagram of a user equipment 70 housing a video decoder 60 with a deblocking filtering control device. The user equipment 70 can be any device having video decoding functions that operates on an encoded bitstream to thereby decode the bitstream and make the video sequence available for display on a screen 74. Non-limiting examples of such devices include video cameras, mobile telephones, smart phones and other portable video players, tablets, lap tops, desktops, notebooks, personal video recorders, multimedia players, video streaming servers, set-top boxes, TVs, computers, decoders, game consoles, etc.

The user equipment 70 comprises a memory 72 configured to store encoded video data. The encoded video data can have been generated by the user equipment 70 itself. Alternatively, the encoded video data is generated by some other device and wirelessly transmitted or transmitted by wire to the user equipment 70. The user equipment 70 then comprises a transceiver (transmitter and receiver) or I/O unit 71 to achieve the data transfer.

The encoded video data is brought from the memory 72 to a video decoder 60, such as the video decoder illustrated in FIG. 12. The video decoder 60 comprises a deblocking filtering control device according to the embodiments. The video decoder 60 then decodes the encoded video data into decoded pictures. The decoded pictures are provided to a video player 73 that is configured to play out the decoded pictures as a video sequence on a screen 74 of or connected to the user equipment 70.

In FIG. 18, the user equipment 70 has been illustrated as comprising both the video decoder 60 and the video player 73, with the video decoder 60 implemented as a part of the video player 73. This should, however, merely be seen as an illustrative but non-limiting example of an implementation embodiment for the user equipment 70. Also distributed implementations are possible where the video decoder 60 and the video player 73 are provided in two physically separated devices are possible and within the scope of user equipment 70 as used herein. The screen 74 could also be provided as a separate device connected to the user equipment 70, where the actual data processing is taking place.

The user equipment 70 may also, or alternatively comprise a video encoder 40, such as the video encoder of FIG. 11, comprising a deblocking filtering control device according to the embodiments. The video encoder 40 is then configured to encode pictures received by the I/O unit 71 and/or generated by the user equipment 70 itself. In the latter case, the user equipment 70 preferably comprises a video engine or video recorder, such as in the form of or connected to a video camera.

The video encoder and/or video decoder of the embodiments may alternatively be implemented in a network device or equipment being or belonging to a network node in a communication network. Such a network equipment may be a device for converting video according to one video coding standard to another video coding standard, i.e., transcoding. The network equipment can be in the form of or comprised in a radio base station, a Node-B or any other network node in a communication network, such as a radio-based network.

It is becoming increasingly popular to provide computing services, hardware and/or software, in network equipment, such as network devices, nodes and/or servers, where the resources are delivered as a service to remote locations over a network. By way of example, this means that functionality, as described herein, can be distributed or re-located to one or more separate physical devices, nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

FIG. 19 is a schematic diagram illustrating an example of how functionality can be distributed or partitioned between different network equipment in a general case. In this example, there are at least two individual, but interconnected network equipment 300, 301, which may have different functionalities, or parts of the same functionality, partitioned between the network equipment 300, 301. There may be additional network devices 302 being part of such a distributed implementation. The network equipment 300, 301, 302 may be part of the same wireless or wired communication system, or one or more of the network devices may be so-called cloud-based network devices located outside of the wireless or wired communication system.

FIG. 20 is a schematic diagram illustrating an example of a wireless communication network or system, including an access network 81 and a core network 82 and optionally an operations and support system (OSS) 83 in cooperation with one or more cloud-based network equipment 300. The figure also illustrates a user equipment 70 connected to the access network 81 and capable of conducting wireless communication with a base station representing an embodiment of a network node 80.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] ITU-T H.265 (April 2015) SERIES H: AUDIOVISUAL AND MULTIMEDIA SYSTEMS, Infrastructure of audiovisual services—Coding of moving video, High efficiency video coding

The invention claimed is:

1. A deblocking filtering control method comprising deciding whether to apply deblocking filtering to sample values that comprise a color component value in a sample block in a picture and in a neighboring sample block in said picture based on i) a first magnitude modification of sample prediction values in a first prediction block in a reference picture for said sample block and ii) a second magnitude modification of sample prediction values in a second prediction block in said reference picture for said neighboring sample block, said sample block and said neighboring sample block being separated in said picture by a block boundary, wherein deciding whether to apply deblocking filtering comprises deciding, if a difference between said average value of said sample values in said sample block and said average value of said sample values in said neighboring sample block is equal to or smaller than a threshold value, whether to apply deblocking filtering to said sample values in said sample block and in said neighboring sample block based on said first magnitude modification of sample prediction values and said second magnitude modification of sample prediction values.

2. The deblocking filtering control method according to claim 1, further comprising:
comparing said first magnitude modification of sample prediction values and said second magnitude modification of sample prediction values, wherein
deciding whether to apply deblocking filtering comprises deciding whether to apply deblocking filtering to said sample values in said sample block and in said neighboring sample block based on said comparison of said first magnitude modification of sample prediction values and said second magnitude modification of sample prediction values.

3. The deblocking filtering control method according to claim 2, wherein deciding whether to apply deblocking filtering comprises:
deciding that deblocking filtering may be applied to said sample values in said sample block and in said neighboring sample block if said first magnitude modification of sample prediction values differs from said second magnitude modification of sample prediction values with at least a threshold value; and
deciding not to apply deblocking filtering to said sample values in said sample block and in said neighboring sample block if said first magnitude modification of sample prediction values does not differ from said second magnitude modification of sample prediction values with at least said threshold value.

4. The deblocking filtering control method according to claim 1, further comprising:
determining a value of a boundary strength parameter based on said first magnitude modification of sample prediction values and said second magnitude modification of sample prediction values, wherein
deciding whether to apply deblocking filtering comprises deciding whether to apply deblocking filtering to said sample values in said sample block and in said neighboring sample block based on said value of said boundary strength parameter.

5. The deblocking filtering control method according to claim 1, wherein deciding whether to apply deblocking filtering comprises deciding to apply deblocking filtering to said sample values in said sample block and in said neighboring sample block based on said first magnitude modification of sample prediction values and said second magnitude modification of sample prediction values, said method further comprising:
deciding whether to apply strong deblocking filtering or weak deblocking filtering to said sample values in said sample block and in said neighboring sample block based on said first magnitude modification of sample prediction values and said second magnitude modification of sample prediction values.

6. The deblocking filtering control method according to claim 5, further comprising:
determining a value of at least one parameter selected from a group consisting of $\beta$ and $t_C$ based on said first magnitude modification of sample prediction values and said second magnitude modification of sample prediction values, wherein
deciding whether to apply said strong deblocking filtering or said weak deblocking filtering comprises deciding to apply said strong deblocking filtering to said sample values in said sample block and in said neighboring sample block if $2\times(|p2_i-2p1_i+p0_i|+|q2_i-2q1_i+q0_i|)<(\beta>>2)$, $|p3_i-p0_i|+|q3_i-q0_i|<(\beta>>3)$ and $|p0_i-q0_i|<((5\times t_C+1)>>1)$, wherein i=0, 3, and otherwise deciding to apply said weak deblocking filtering to said sample values in said sample block and in said neighboring sample block, wherein $p0_i$ denotes a sample value of a first sample, relative to said block boundary, in a line i of samples in said sample block, $p1_i$ denotes a sample value of a second sample, relative to said block boundary, in said line i of samples in said sample block, $p2_i$ denotes a sample value of a third sample, relative to said block boundary, in said line i of samples in said sample block, $q0_i$ denotes a sample value of a first sample, relative to said block boundary, in said line i of samples in said neighboring sample block, $q1_i$ denotes a sample value of a second sample, relative to said block boundary, in said line i of samples in said neighboring sample block, and $q2_i$ denotes a sample value of a third sample, relative to said block boundary, in said line i of samples in said neighboring sample block.

7. The deblocking filtering control method according to claim 1, wherein deciding whether to apply deblocking filtering comprises deciding, if none of said sample block and said neighboring sample block is predicted using Overlapped Block Motion Compensation (OBMC), whether to apply deblocking filtering to said sample values in said sample block and in said neighboring sample block based on said first magnitude modification of sample prediction values and said second magnitude modification of sample prediction values.

8. The deblocking filtering control method according to claim 1, wherein deciding whether to apply deblocking filtering comprises deciding whether to apply deblocking filtering to said sample values in said sample block and in said neighboring sample block based on i) a value of a first weighted prediction parameter for said first prediction block and ii) a value of a second weighted prediction parameter for said second prediction block.

9. The deblocking filtering control method according to claim 8, wherein deciding whether to apply deblocking filtering comprises deciding whether to apply deblocking filtering to said sample values in said sample block and in said neighboring sample block based on i) a value of a first weighting factor for said sample prediction values of said first prediction block and ii) a value of a second weighting factor for said sample prediction values of said second prediction block.

10. The deblocking filtering control method according to claim 8, wherein deciding whether to apply deblocking filtering comprises deciding whether to apply deblocking filtering to said sample values in said sample block and in said neighboring sample block based on i) a value of a first additive offset for said sample prediction values of said first prediction block and ii) a value of a second additive offset for said sample prediction values of said second prediction block.

11. The deblocking filtering control method according to claim 1, wherein deciding whether to apply deblocking filtering comprises deciding whether to apply deblocking filtering to said sample values in said sample block and in said neighboring sample block based on i) a value of a first Local Illumination Compensation (LIC) parameter for said first prediction block and ii) a value of a second LIC parameter for said second prediction block.

12. The deblocking filtering control method according to claim 11, wherein deciding whether to apply deblocking filtering comprises deciding whether to apply deblocking filtering to said sample values in said sample block and in said neighboring sample block based on i) a value of a first LIC weighting factor for said sample prediction values of said first prediction block and ii) a value of a second LIC weighting factor for said sample prediction values of said second prediction block.

13. The deblocking filtering control method according to claim 11, wherein deciding whether to apply deblocking filtering comprises deciding whether to apply deblocking filtering to said sample values in said sample block and in said neighboring sample block based on i) a value of a first LIC additive offset for said sample prediction values of said first prediction block and ii) a value of a second LIC additive offset for said sample prediction values of said second prediction block.

14. The deblocking filtering control method according to claim 1, wherein deciding whether to apply deblocking filtering comprises deciding whether to apply deblocking filtering to said sample values in said sample block and in said neighboring sample block based on i) a value of a first filter parameter of a first interpolation filter for said first prediction block and ii) a value of a second filter parameter of a second interpolation filter for said second prediction block.

15. The deblocking filtering control method according to claim 14, wherein deciding whether to apply deblocking filtering comprises deciding whether to apply deblocking filtering to said sample values in said sample block and in said neighboring sample block based on i) a value of a first filter gain of said first interpolation filter and ii) a value of a second filter gain of said second interpolation filter.

16. A deblocking filtering control device, wherein said deblocking filtering control device is configured to decide whether to apply deblocking filtering to sample values that comprise a color component value in a sample block in a picture and in a neighboring sample block in said picture based on i) a first magnitude modification of sample prediction values in a first prediction block in a reference picture for said sample block and ii) a second magnitude modification of sample prediction values in a second prediction block in said reference picture for said neighboring sample block, said sample block and said neighboring sample block being separated in said picture by a block boundary, wherein deciding whether to apply deblocking filtering comprises deciding, if a difference between said average value of said sample values in said sample block and said average value of said sample values in said neighboring sample block is equal to or smaller than a threshold value, whether to apply deblocking filtering to said sample values in said sample block and in said neighboring sample block based on said first magnitude modification of sample prediction values and said second magnitude modification of sample prediction values.

17. The deblocking filtering control device according to claim 16, further comprising:
 a processor; and
 a memory comprising instructions executable by said processor, wherein said processor is operative to decide whether to apply deblocking filtering to said sample values in said sample block and in said neighboring sample block based on said first magnitude modification of sample prediction values and said second magnitude modification of sample prediction values.

18. A video encoder comprising a deblocking filtering control device according to claim 16.

19. A video decoder comprising a deblocking filtering control device according to claim 16.

20. A user equipment comprising a deblocking filtering control device configured to perform video encoding and video decoding according to claim 16, wherein said user equipment is selected from a group consisting of a video camera, a computer, a laptop, a smart phone, a tablet, a game console and a set-top box.

21. A computer program product comprising a non-transitory computer readable medium storing instructions, which when executed by at least one processor, cause said at least one processor to decide whether to apply deblocking filtering to sample values that comprise a color component value in a sample block in a picture and in a neighboring sample block in said picture based on i) a first magnitude modification of sample prediction values in a first prediction block in a reference picture for said sample block and ii) a second magnitude modification of sample prediction values in a second prediction block in said reference picture for said neighboring sample block, said sample block and said neighboring sample block being separated in said picture by a block boundary, wherein deciding whether to apply deblocking filtering comprises deciding, if a difference between said average value of said sample values in said sample block and said average value of said sample values in said neighboring sample block is equal to or smaller than a threshold value, whether to apply deblocking filtering to said sample values in said sample block and in said neighboring sample block based on said first magnitude modification of sample prediction values and said second magnitude modification of sample prediction values.

* * * * *